(12) United States Patent
Mack et al.

(10) Patent No.: US 7,032,179 B2
(45) Date of Patent: Apr. 18, 2006

(54) SYSTEM FOR CREATING ON A COMPUTER DISPLAY SCREEN COMPOSITE IMAGES FROM DIVERSE SOURCES

(75) Inventors: Stephen T. Mack, Los Altos, CA (US); Donald J. Pierce, Belmont, CA (US)

(73) Assignee: Peer Image, Inc., Santa Clara, CA (US)

( * ) Notice: Subject to any disclaimer, the term of this patent is extended or adjusted under 35 U.S.C. 154(b) by 525 days.

(21) Appl. No.: 09/879,446

(22) Filed: Jun. 11, 2001

(65) Prior Publication Data

US 2002/0054115 A1    May 9, 2002

Related U.S. Application Data

(60) Provisional application No. 60/211,096, filed on Jun. 12, 2001.

(51) Int. Cl.
*G06F 9/00* (2006.01)

(52) U.S. Cl. ............... 715/762; 715/760; 715/744; 715/853

(58) Field of Classification Search ............... 345/660, 345/636, 760, 762, 744, 853
See application file for complete search history.

(56) References Cited

U.S. PATENT DOCUMENTS

| 5,586,238 | A | | 12/1996 | Murata |
| 5,611,031 | A | | 3/1997 | Hertzfeld et al. |
| 5,752,053 | A | * | 5/1998 | Takakura et al. ........... 715/505 |
| 5,796,401 | A | | 8/1998 | Winer |
| 5,852,435 | A | | 12/1998 | Vigneaux et al. |
| 5,987,456 | A | * | 11/1999 | Ravela et al. ............... 707/5 |
| 6,014,147 | A | | 1/2000 | Politis et al. |
| 6,125,374 | A | | 9/2000 | Terry et al. |
| 6,167,382 | A | * | 12/2000 | Sparks et al. .............. 705/26 |
| 6,185,589 | B1 | | 2/2001 | Votipka |
| 2003/0034991 | A1 | * | 2/2003 | Fitzsimons et al. ......... 345/660 |
| 2003/0140315 | A1 | * | 7/2003 | Blumberg et al. .......... 715/527 |

* cited by examiner

*Primary Examiner*—Kristine Kincaid
*Assistant Examiner*—Peng Ke
(74) *Attorney, Agent, or Firm*—Robert S. Kelly

(57) ABSTRACT

An interactive user/server system wherein a user with a computer, a display screen and an Internet connection through a browser can create in real time a composite image of graphical images and text capable of being outputted for high quality printing on an end product such as a sticker. The user will download selected graphical images and lines of text from the server and resize and reposition them from a predetermined location to any location within a predetermined canvas area of his display screen to build up the composite image. The user can add his own graphical images to the composite image being created if desired by first uploading them to the server. The complete composite image created will be stored at the server in its component parts in a computer/web protocol so that it can readily be assembled in high resolution form for outputting to a printer.

16 Claims, 15 Drawing Sheets

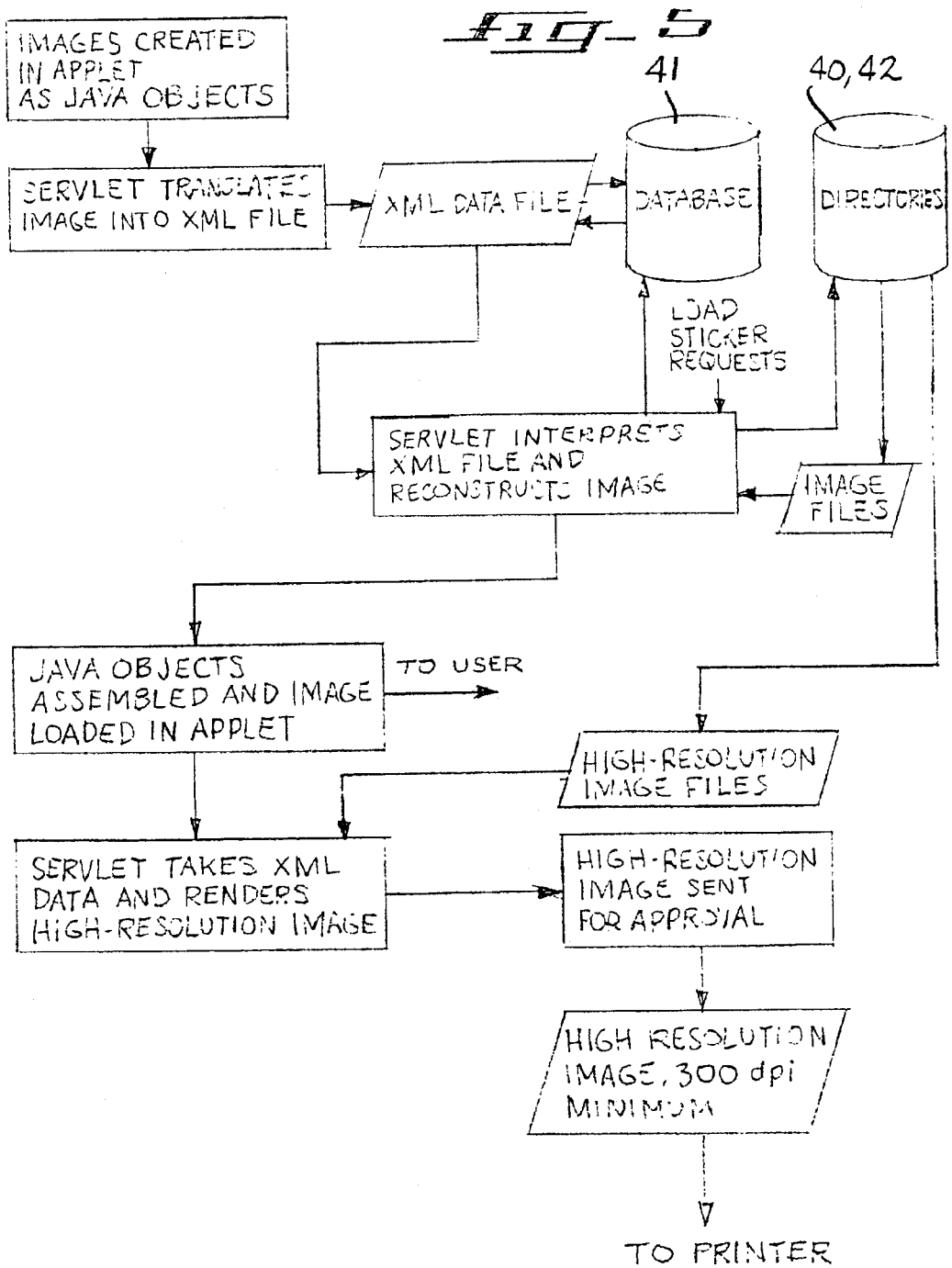

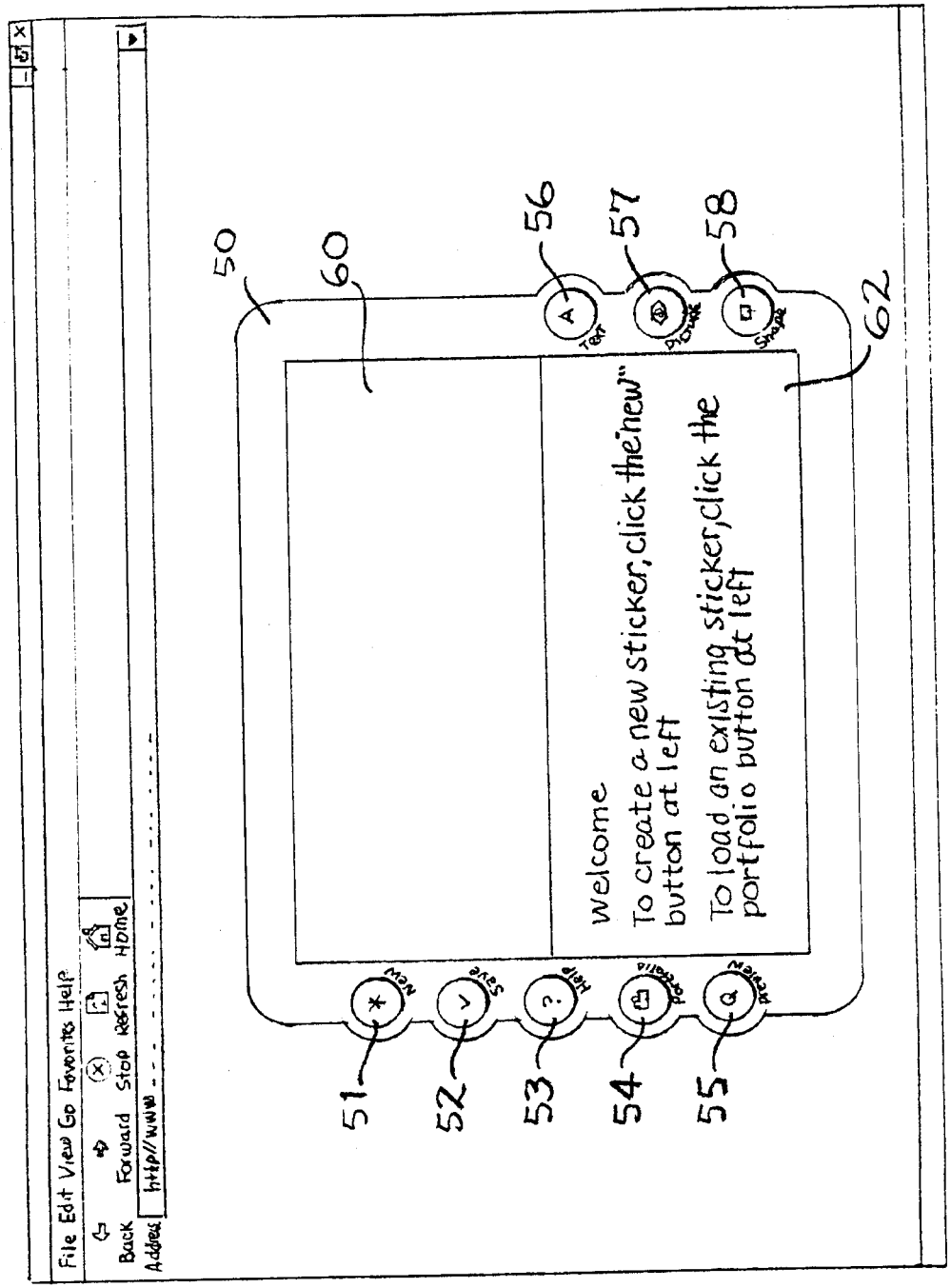

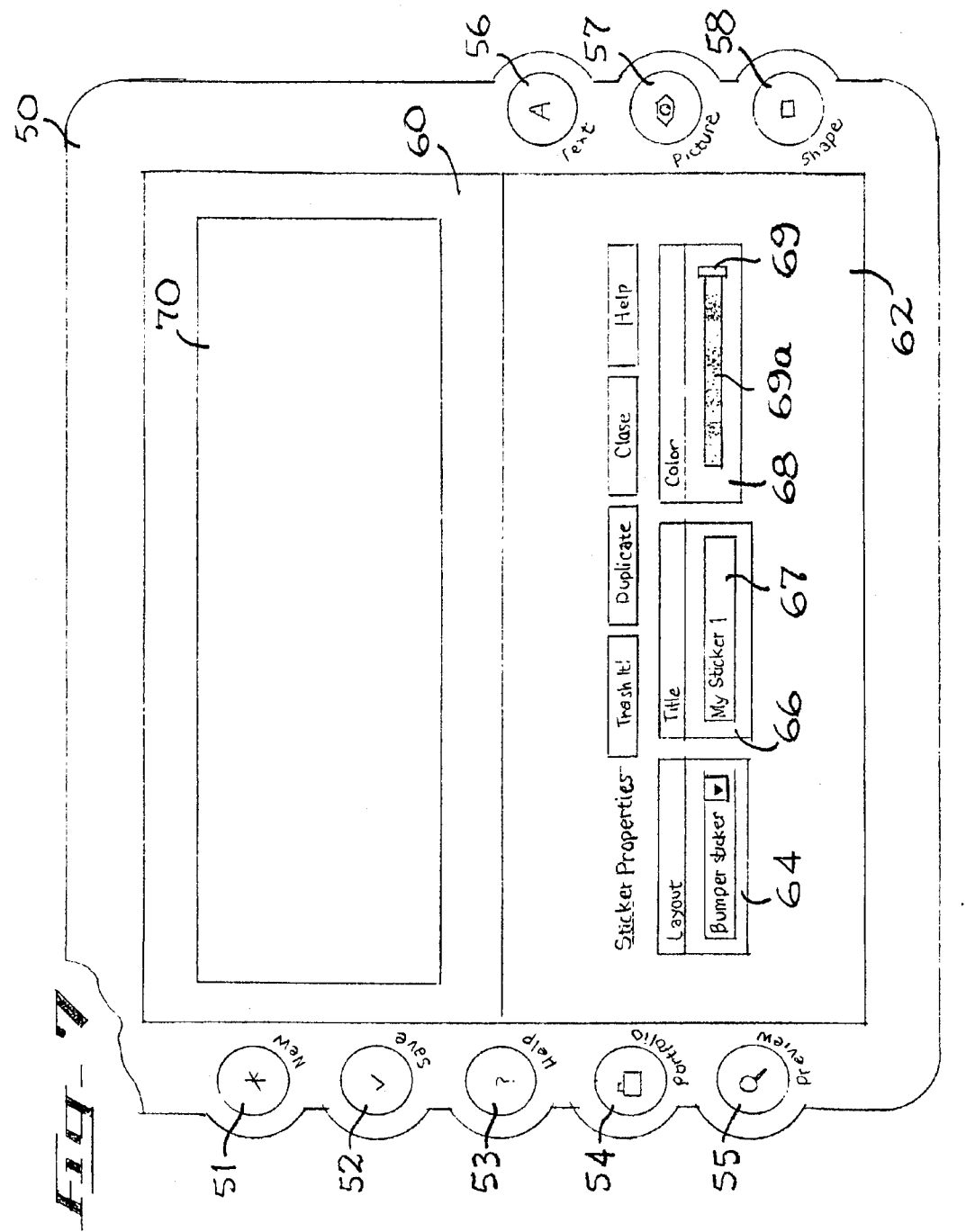

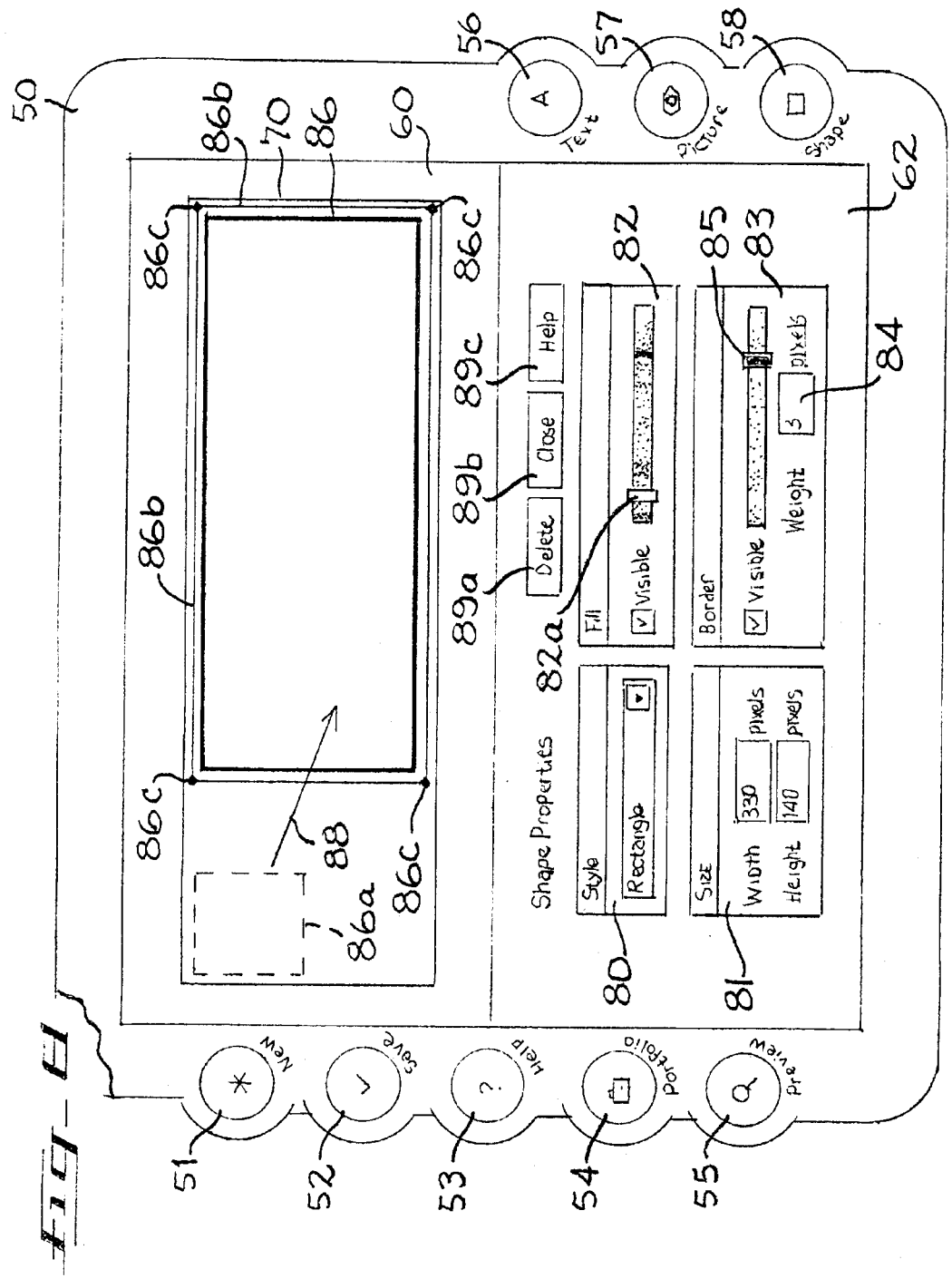

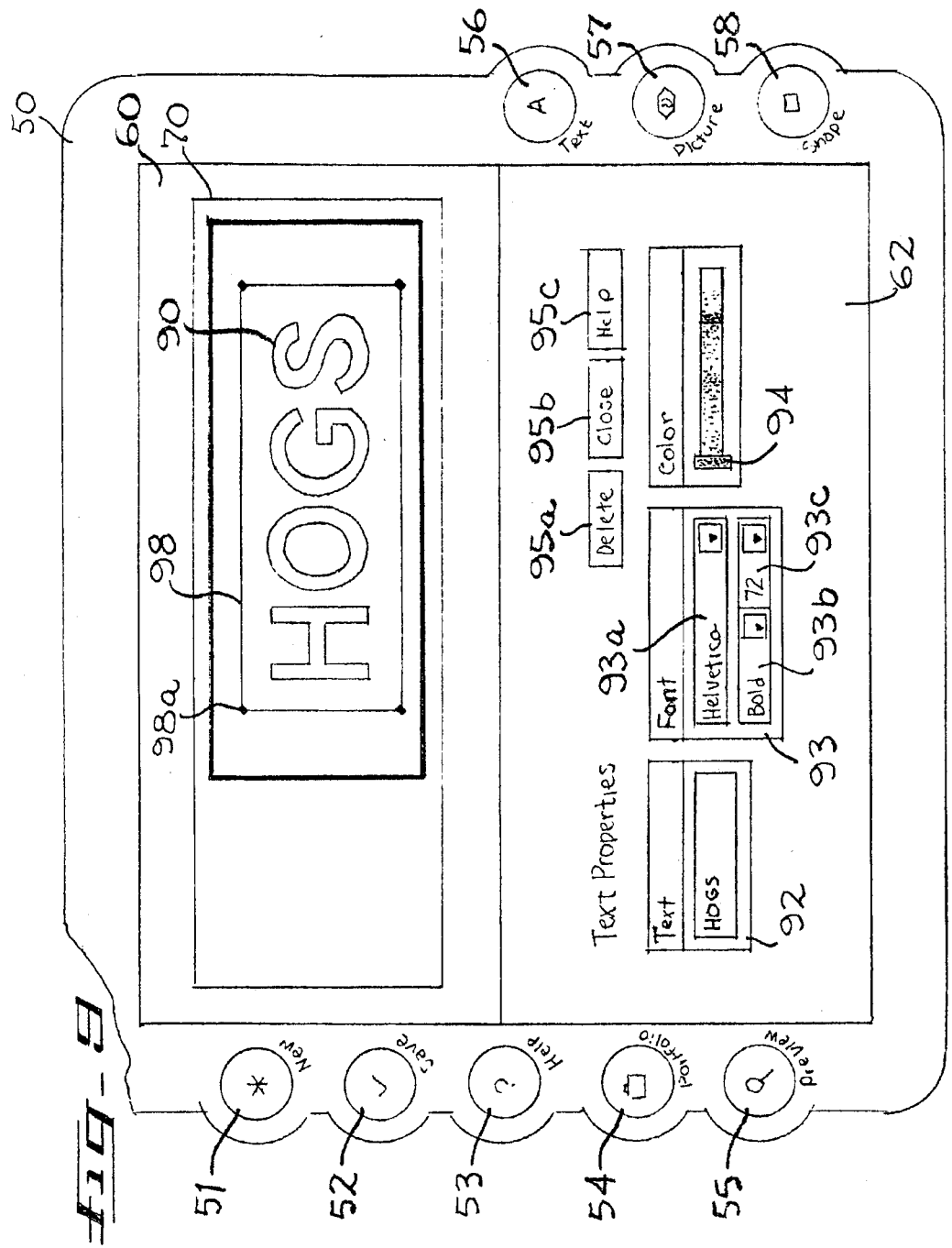

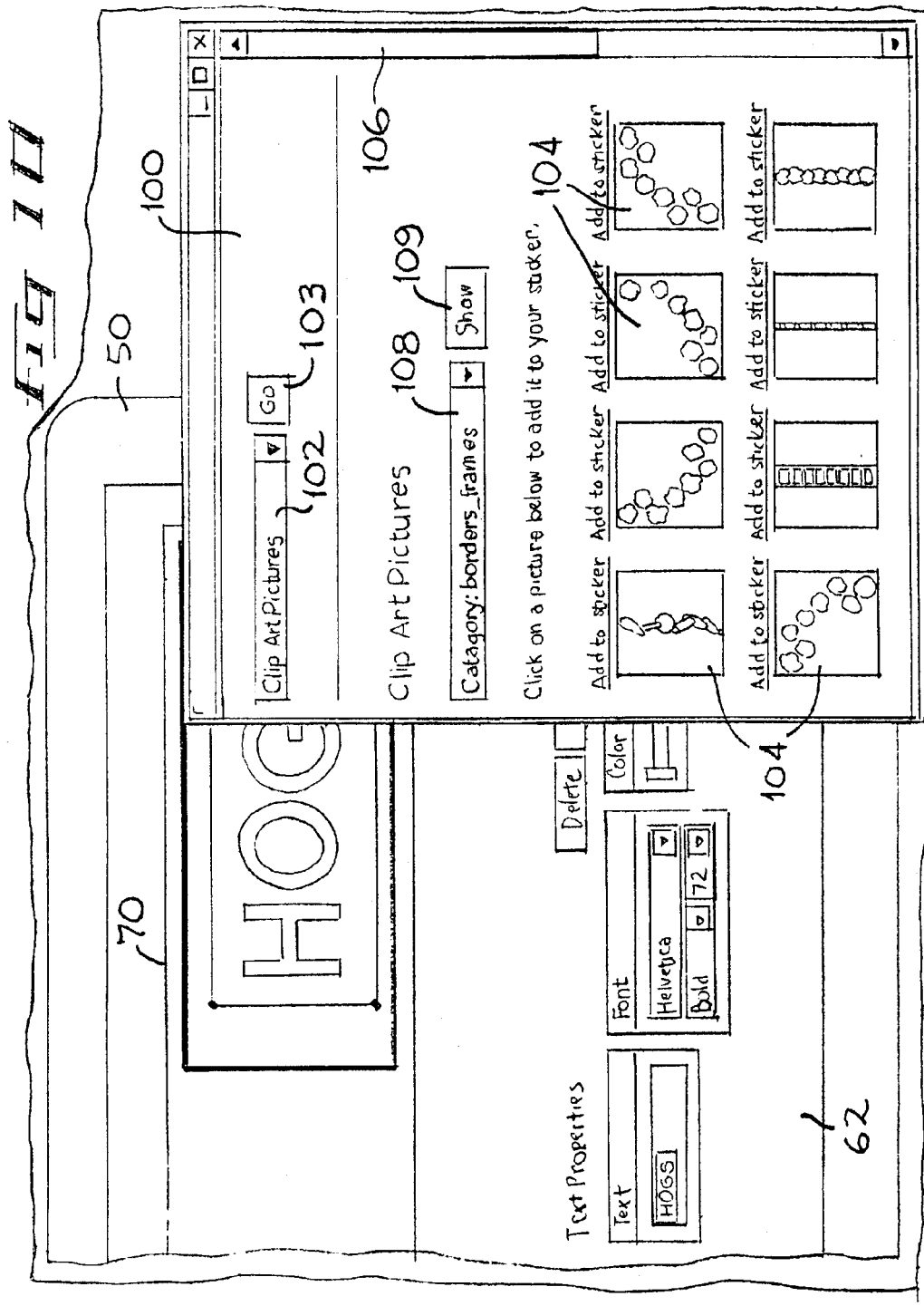

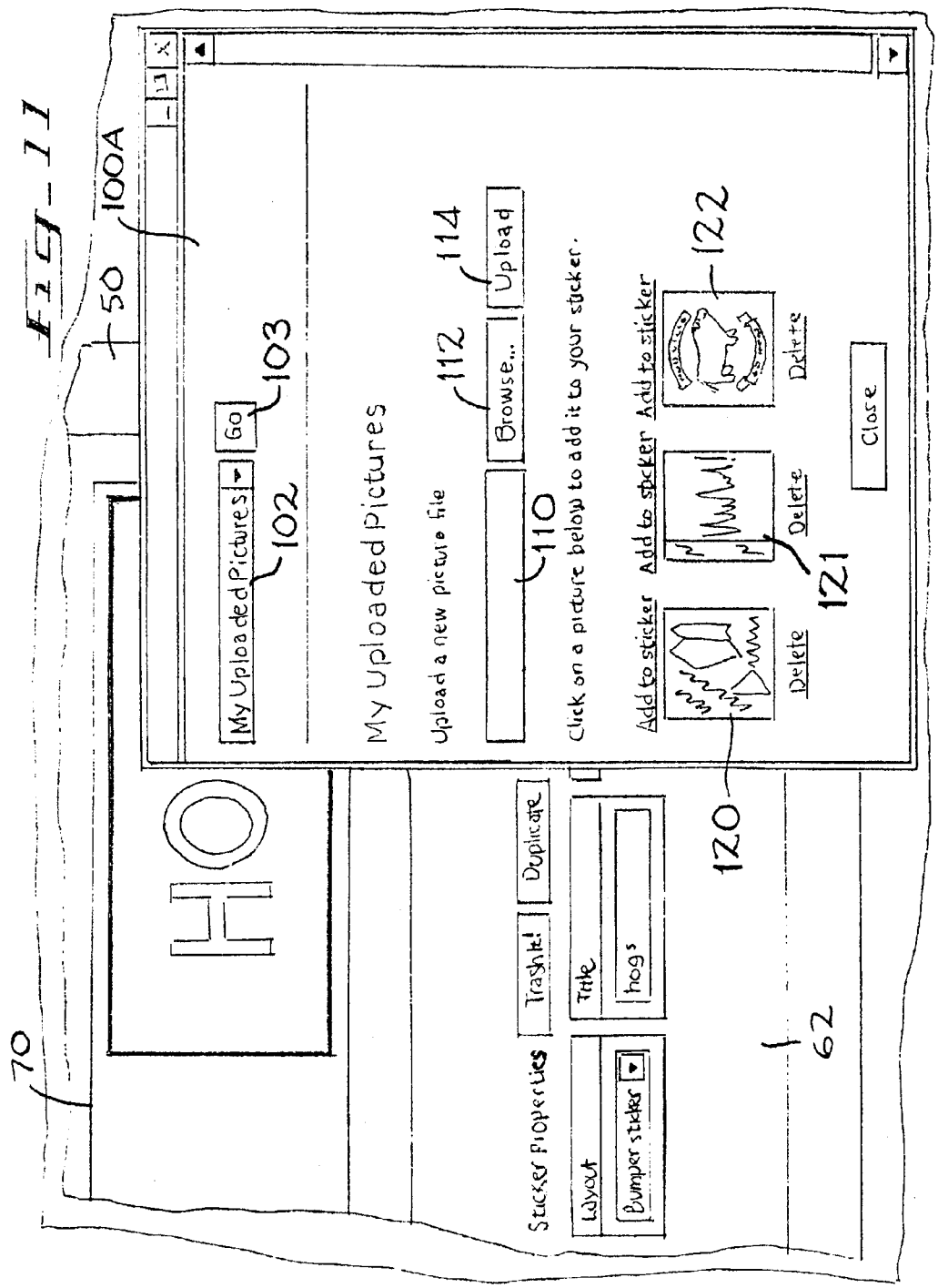

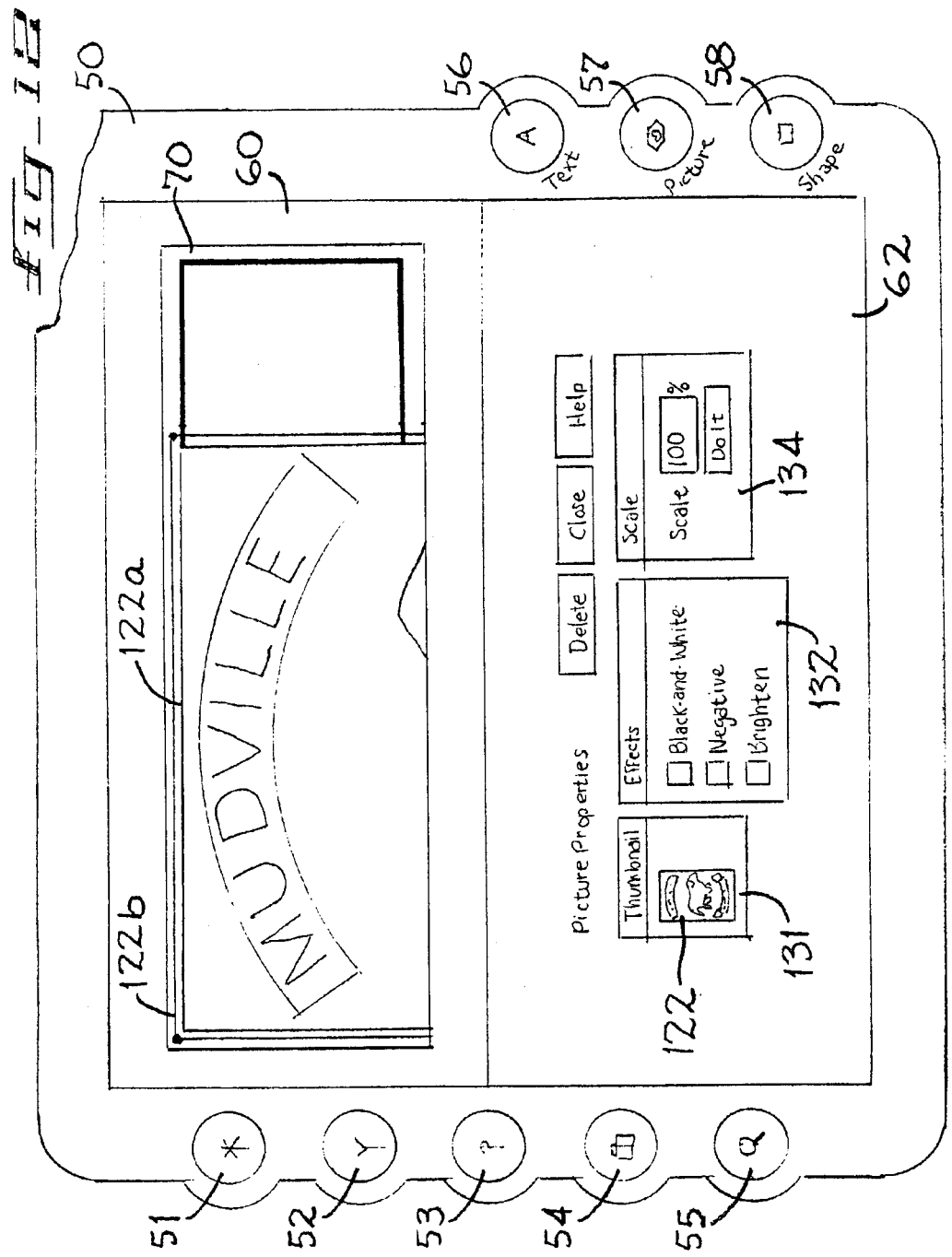

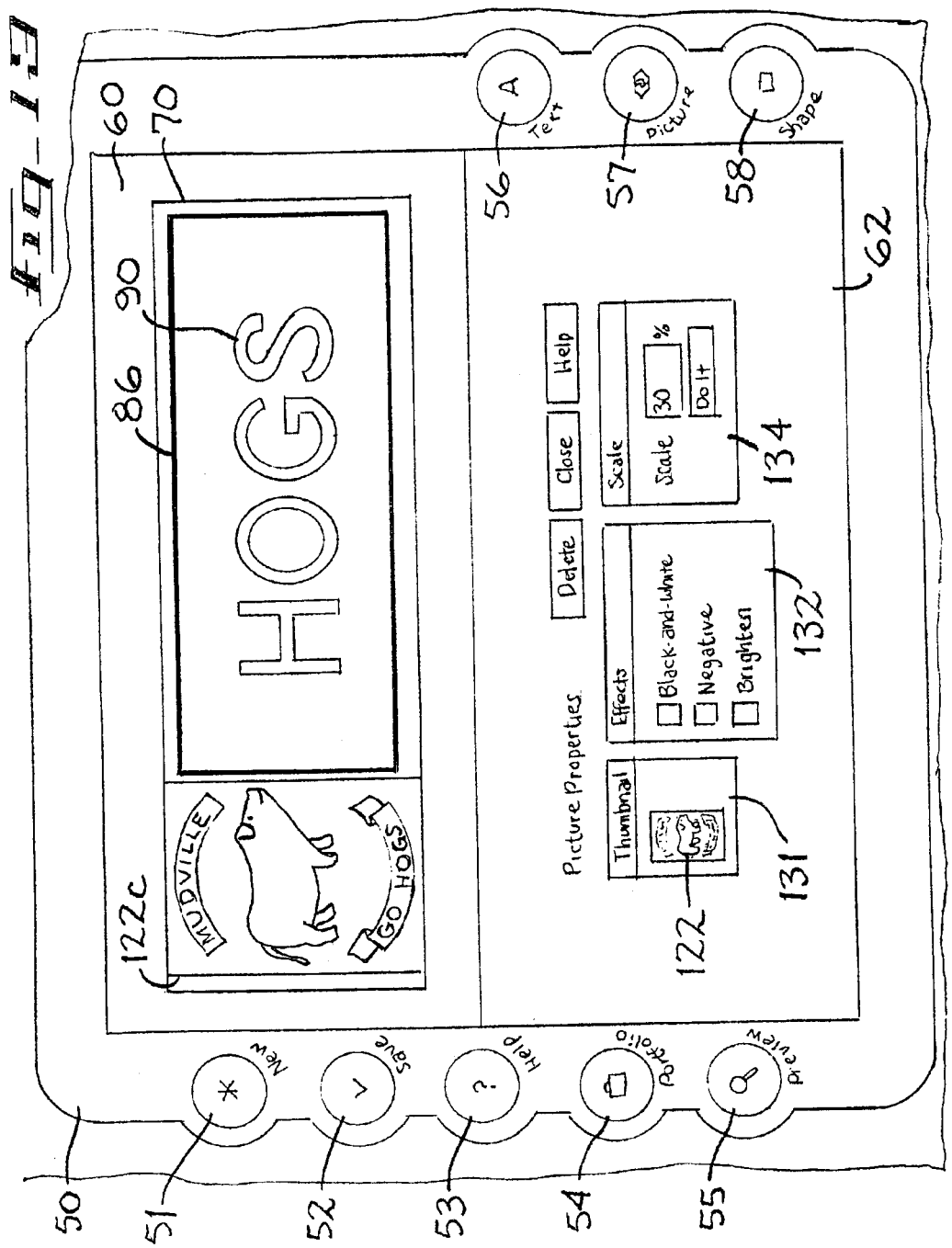

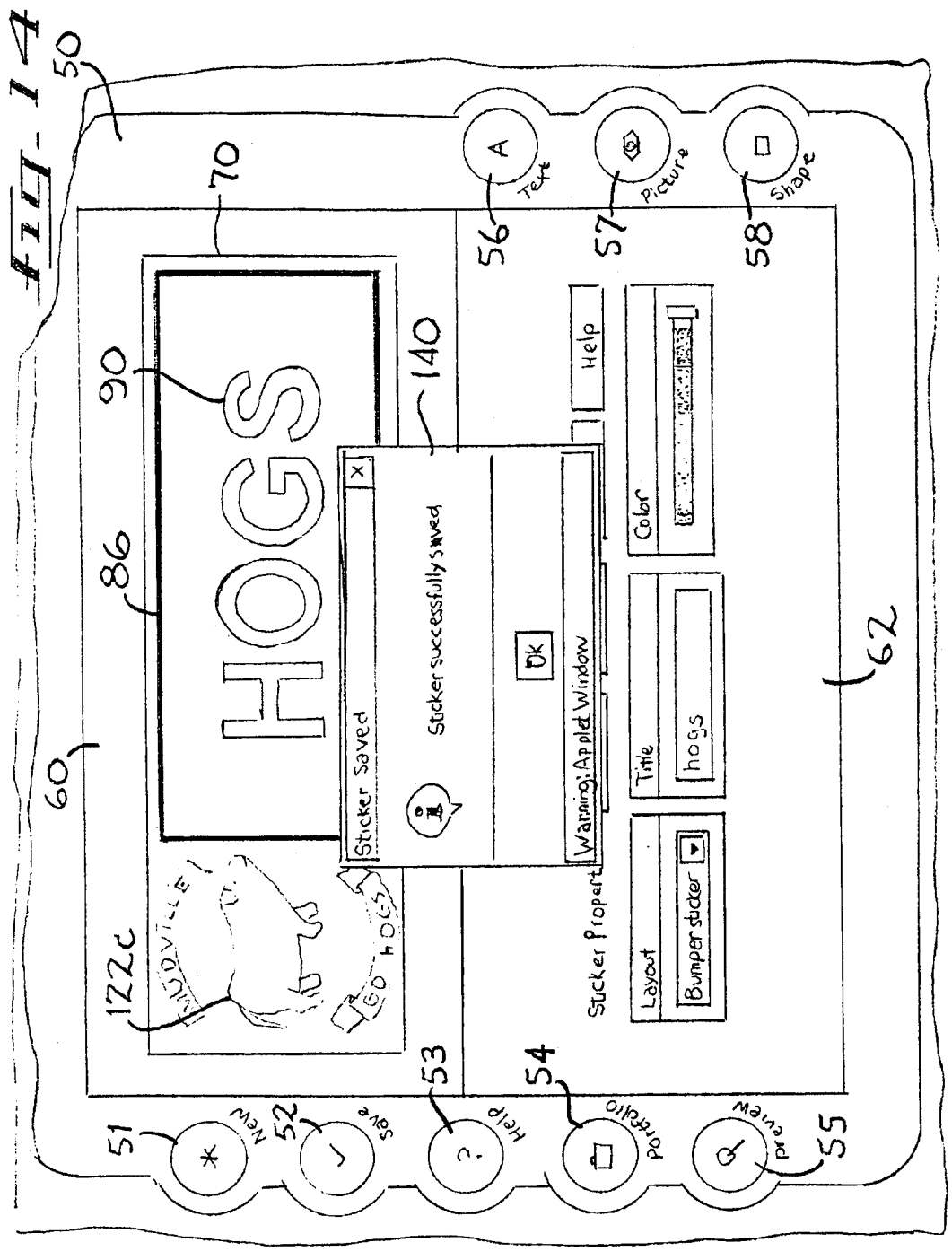

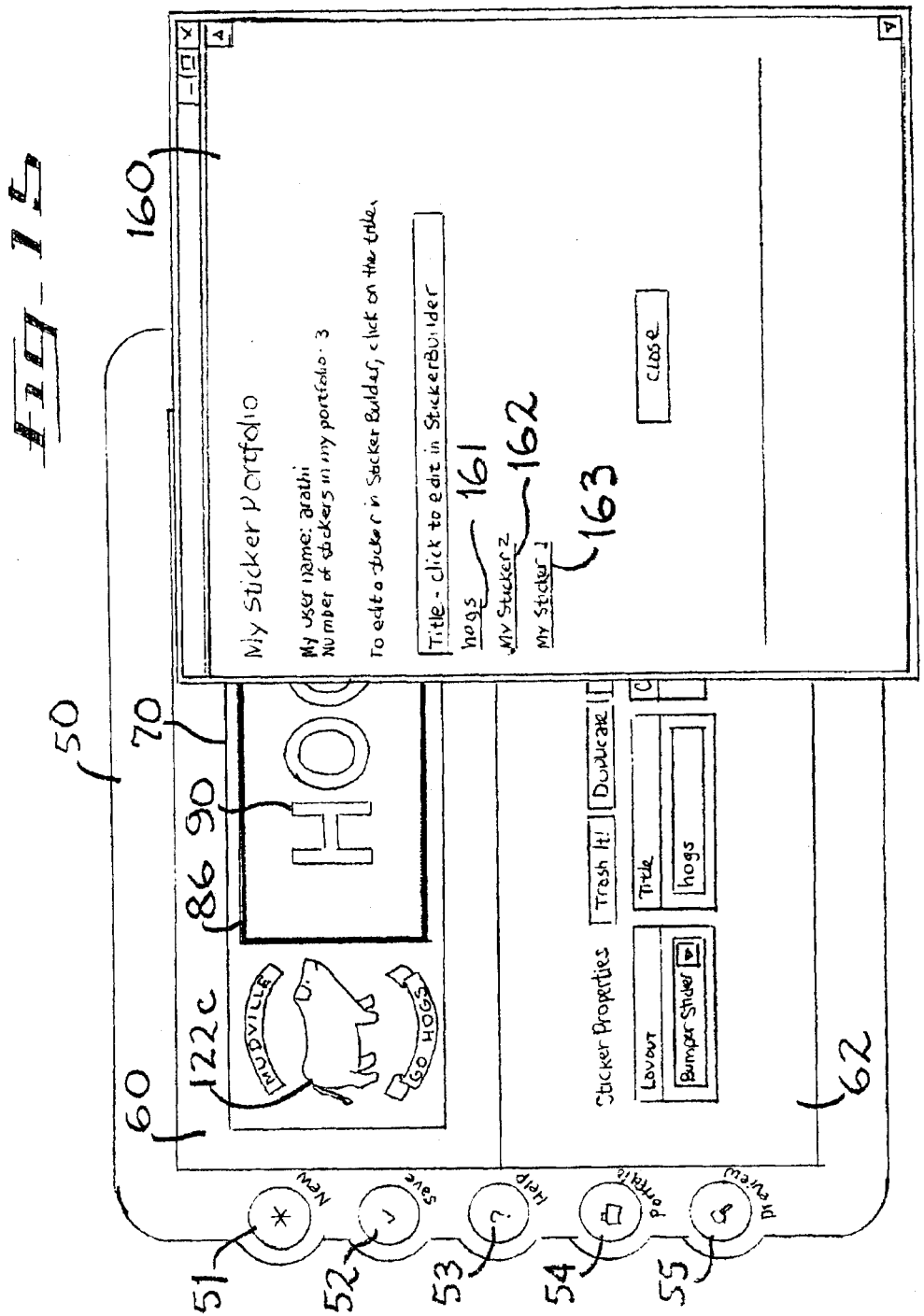

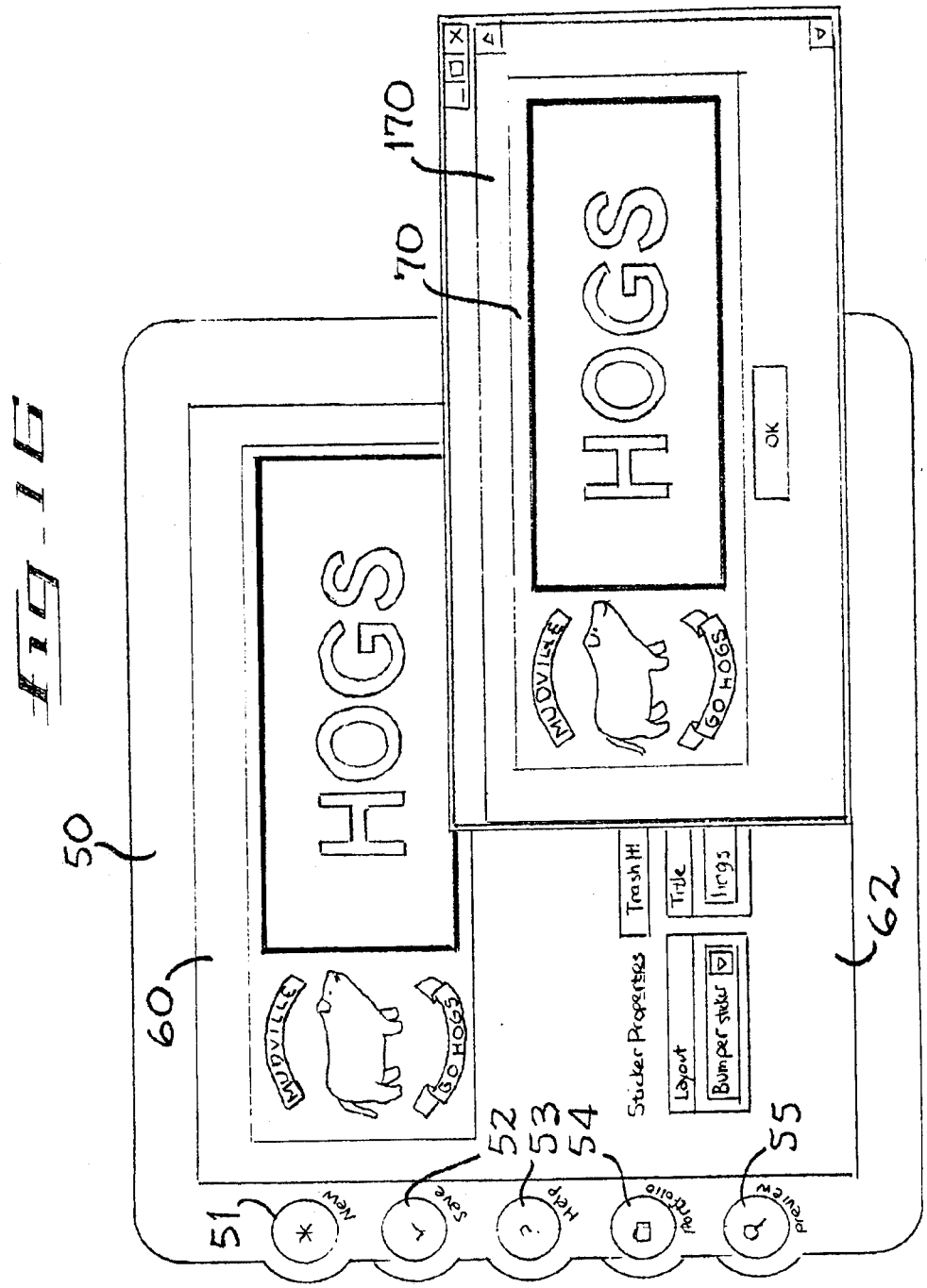

SYSTEM FOR CREATING ON A COMPUTER DISPLAY SCREEN COMPOSITE IMAGES FROM DIVERSE SOURCES

REFERENCE TO PRIOR APPLICATION

This application claims the benefit of U.S. Provisional Application No. 60/211,096, filed Jun. 12, 2000 and entitled SYSTEM FOR CREATING IMAGES ON A COMPUTER SCREEN FOR OUTPUT AS HIGH RESOLUTION STICKERS OR THE LIKE.

BACKGROUND OF THE INVENTION

The present system pertains to interactive systems between users and servers on a global communications network, and more particularly, it pertains to such a system for creating a composite image on a computer display screen from a plurality of diverse sources.

With the rapid expansion of the World Wide Web (the web) through a global communications network, commonly known as the Internet, during the last decade, individual users operating from their own homes or offices on their personal computers, have been able to create a variety of composite text/image documents on their computer display screens suitable for printing out in various formats. This has been accomplished by working with a predetermined program previously loaded into the computer hard drive (such as the common Adobe graphics programs), or by operating interactively through a browser with a server which can continuously provide online aid and resources through downloadable Java applets or other programming tools as well as text and other graphic files.

One such interactive system of the prior art permitted the user to co-act online with the server to create a computer screen image which could later be printed out as a business card, banner, magnetic sign, etc. The process generally required the user to communicate all changes to the server which could then make the changes to the saved image at the server and then refresh the user screen to indicate the changes made to the user.

Another method of creating labels or the like using an interactive computer system operated by a user is shown in U.S. Pat. No. 6,125,374. In this system a database containing predesigned graphics is provided and stored along with a drawing program. The method includes a template selector which is user-operated to automatically select the predesigned graphics from the database, and the selected predesigned graphics are launched into the drawing program which is user-operated to manipulate the graphics.

SUMMARY OF THE INVENTION

The system of the present invention comprises an online tool used in connection with the World Wide Web (the web) to allow individual users accessing the web through their personal computers and their Internet service providers (ISPs) to design and create their own composite (graphics and text) images directly from their web browser. The system includes a downloadable program from the server computer which creates a large working space on the face of the computer monitor screen for constructing the image which space is surrounded by a plurality of links creating easy-to-use, changeable onscreen operating instructions that allow the user in successive steps to continuously build his image in real time to his own particular desires and specifications.

In particular, the user can add varying shapes, images, colors and text to his sticker by means of a conventional pointing device, e.g., a mouse, from various pull-down menus or other user interface controls created on the screen. The user will also be able to upload his own images, e.g., a picture of himself, to add to the image-in-progress. It is an important feature of the invention that the image will be fully viewable in real time as it is created, and that, therefore, editing and various alternatives can be tried at each step rather than only at the end of the complete process or without refreshing the browser. Thus, the process of the present invention gives users unprecedented flexibility in designing and creating their own images.

Another important feature of the invention is the use of a computer/web protocol that identifies the various components of the composite image created by the user and the way that they are combined to form the image and that permits maximum flexibility in the system by permitting the various component parts of the created image to be separately stored in their chosen formats. The XML (extensible markup language), which is comprised of ASCII text files describing name-value pairs for the various objects within the composite image, has proven to be particularly useful for this purpose. Thus, upon completion of the image creation process, the composite image may be saved within the server's database economically by separately storing its various component parts, e.g., uploaded images, server images, and the coded (preferably XML) data. If the user, for example, desires to create a real-world version of the image creation, such as a banner or a sticker, the component parts of the image can be automatically assembled in the proper relationship and with the appropriate resolution, and the finished image can be created as a high resolution image for final processing, previewing, final viewing and printing.

BRIEF DESCRIPTION OF THE DRAWINGS

FIG. 4 is an illustration of the data in a user database table representing the image as it is stored in accordance with the system of the present invention.

FIG. 5 is a flow chart illustrating the manner in which the created image is stored, processed and outputted from the server's computer.

FIGS. 6–16 are diagrammatic representations of successive web pages on the user's computer display screen representing the process of the present invention as the user goes through the sequential steps in creating an image.

DESCRIPTION OF THE PREFERRED EMBODIMENTS

While the system and process of the present invention can be used to produce high resolution printable digital images for many different ultimate uses, e.g., posters, signs, book jackets, place mats, etc., the system has been specifically designed to produce such high quality printable images irrespective of the particular end product ultimately produced. In the embodiment of the invention to be described herein, such images are designed to be outputted in the form of stickers (such as the common adhesive-backed bumper sticker), and the description hereafter will refer to the end product to be ultimately created as a sticker although it will be recognized that the image creating system of the present invention is obviously applicable to other products.

Figure 1:
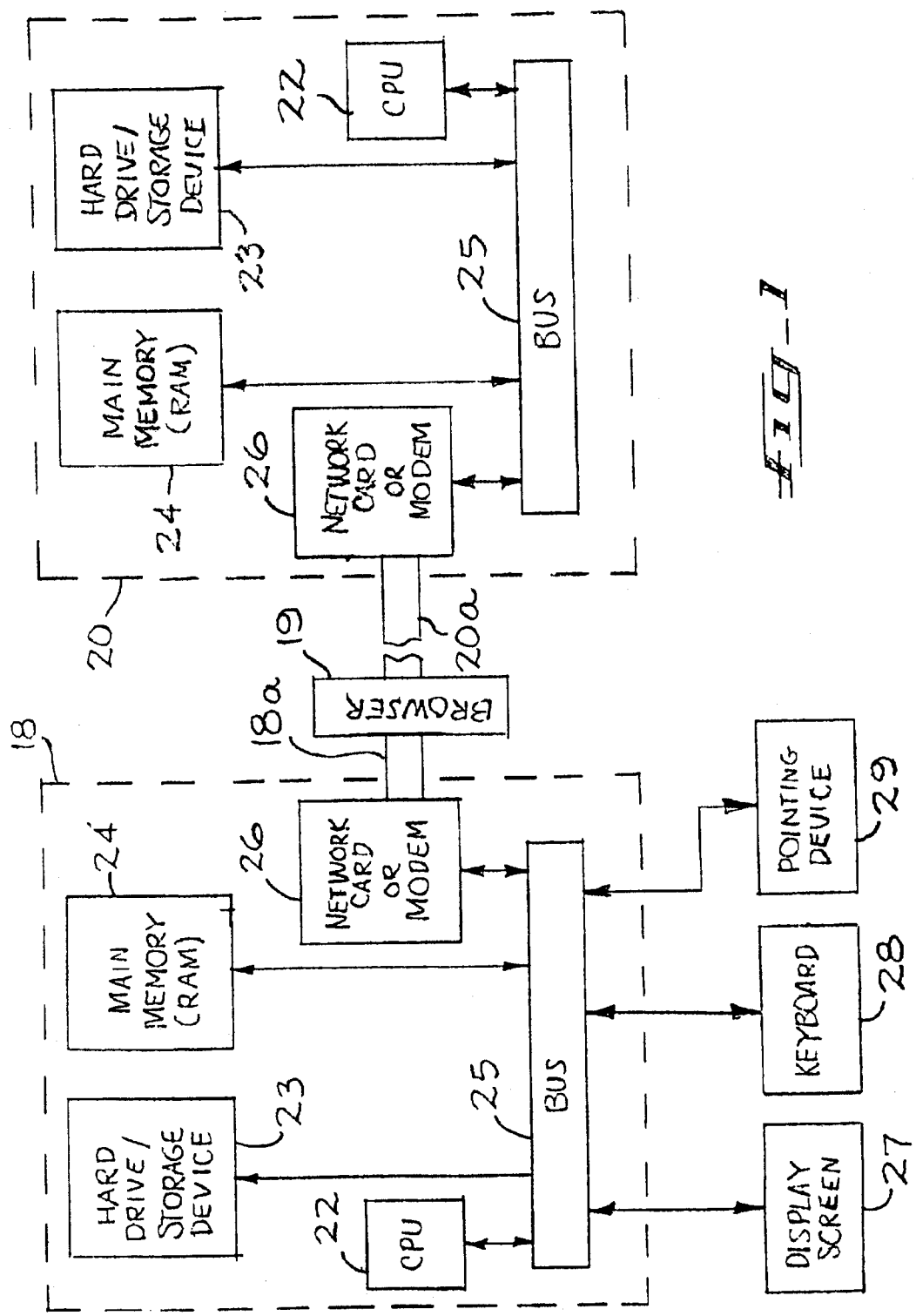
FIG. 1 is a diagrammatic illustration of the image creating system of the present invention showing the main operating components of the server computer and a typical user computer connected through a global communication network to create a new image design.

FIG. 1 illustrates in diagrammatic form the essential operating components of a functioning interactive computer system utilizing the present invention which will be seen to include a computer 18 of the user or customer that can be connected via an Internet connection 18a and a conventional browser 19 with a computer 20 of the server. As can be seen, each computer 18,20 includes its conventional main operating components including a central processing unit (CPU) 22, a hard drive or storage device 23, a random access memory (RAM) or other dynamic storage device 24, and a network card or modem 26, and with all of such devices being connected together through a bus 25 for communicating information therebetween. The information in the user computer 18 is monitored by a conventional monitor or display screen 27 and is controlled through a conventional keyboard 28 and position indicating means or pointing device, e.g., a mouse, 29. Each computer will then be connected through the Internet to the World Wide Web (the user being connected thereto through its internet service provider and browser 19 and the server being connected continuously online at 20a through a conventional, monitored commercial data center) so that continuous interaction will be provided between user and server as the sticker is successively built up by the user.

Figure 2:
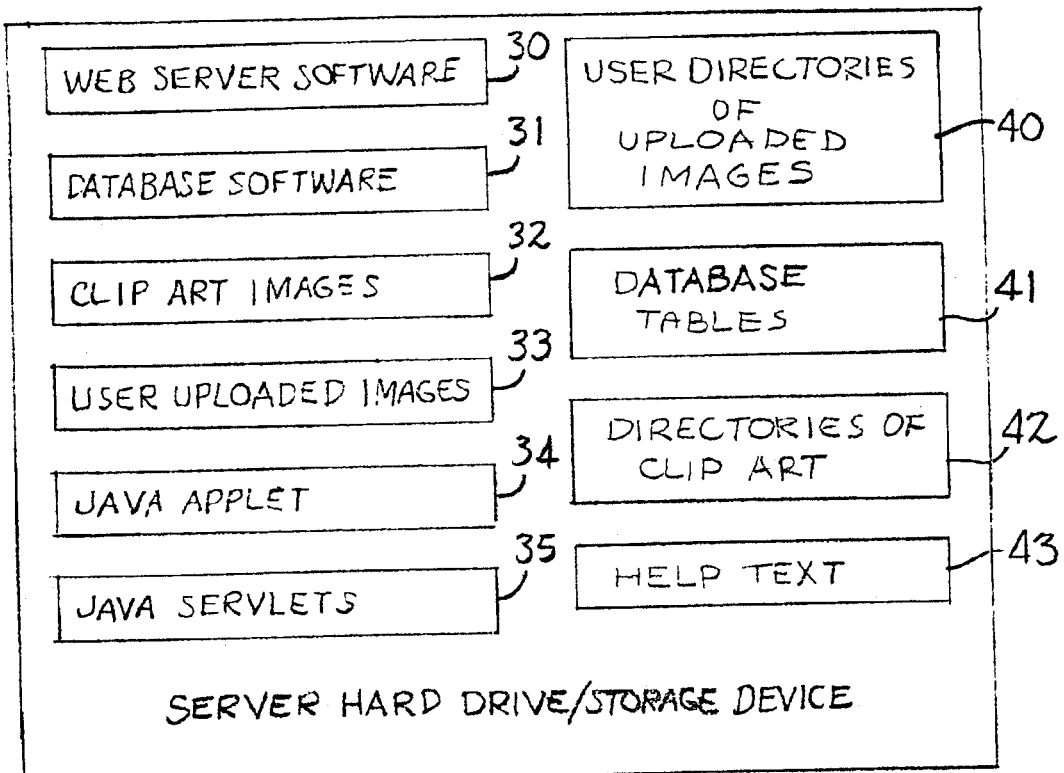
FIG. 2 is a diagrammatic illustration of the software storage device in the server computer of FIG. 1 illustrating the various software programs and files to be used in operating the system of the present invention and the various types of data to be stored therein.

FIG. 2 illustrates diagrammatically the primary storage device, or hard drive 23, of the server computer which contains all of the various bits of software for operating the system of the present invention and which also provides space for individual files that are provided for use in the sticker building process and for individual sticker identifying files which are created during the sticker building process so that they can be stored for later retrieval and potential revision in a manner to be explained presently. In the FIG. 2 arrangement, the programming software for the various separate functions performed by the system of the present invention is set forth in lettered blocks on the left-hand side of the Figure, and the various files created are set forth in the right-hand side of the Figure in lettered blocks. Thus, there is stored at the server conventional web server software 30, i.e., a stand-alone program that allows the server to provide the requisite web pages for any user when a request is received over the Internet connection 20a. Conventional database software 31 is also stored at the server to permit the server to set up individual database tables for each record (individual sticker) of the individual users (customers) accessing the system, such records with their corresponding information being stored as database tables at 41 (FIG. 2) of the server storage device. A conventional program 32 is also stored for receiving, storing, and downloading a plurality of clip art images, i.e., a series of various graphical images provided in a number of different and separately downloadable categories by the server and which can be individually selected and incorporated into the sticker as it is created by the user. These clip art images, which may be proprietary to or licensed by the server or public domain, are stored as low resolution (72 dpi) GIF or JPEG files at 42 as indicated (FIG. 2) in the server hard drive for downloading to the user when a sticker is being created. However, a separate file of high-resolution TIFF or encapsulated postscript (EPS) images (300 dpi minimum) of such clip art is also provided at 42 for use in printing out the sticker in final form. Conventional software 33 (FIG. 20) is utilized for receiving and storing uploaded images from the user which images may be in any graphical format as received and which may include computer graphics encoded photographs or the like. These uploaded images are stored in a separate directory 40 on the server hard drive in the same format as that in which they are received and also in a low-resolution "thumbnail" form, created as a scaled-down version of the original image by the server software, for a purpose to be explained hereinafter. The user directories 40 will also include a portfolio file for each user which will include a listing of each sticker created by each individual user and which can be downloaded in a manner to be explained in greater detail hereinafter. In addition a "Help" text file 43 is provided on the server hard drive for downloading to any user should he need and request further instructions for using the sticker creating system.

A representation of a user database table 46 is shown in FIG. 4, such table representing a conventional computer database record with the individual fields being indicated in the left-hand column (under "Column Name") for each individual sticker created by the various users of the system and with each field entry being identified (in the right-hand column of FIG. 4) by its "datatype", e.g., varchar (variable character), text (text based), etc. As the user identifies himself to the server and enters in the various requested information required to create a new sticker (the details of such process to be disclosed hereinafter) the requisite information will be filled in by the database software 31 of the server and stored within the database storage space 41 (FIG. 2) on the server hard drive. Thus, for each sticker to be created an "ID" will be automatically issued by the server, such ID serving to separately numerically identify each sticker in the database 41. In "created", the date of initial creation of the sticker is placed (automatically by the server software 31), and in "modified", the date of the last modification of the sticker is placed (automatically by the server software 31). The user's name (as identified to the server for contact or contract purposes) is entered, and the title of the sticker (as selected by the user) is also entered as shown. Finally, the XML code description of the sticker is provided in each database table row (corresponding to a single sticker) to provide the text description of or link to and the assembly instructions for the various component parts of the sticker.

One of the features of the present invention is the use of user-downloadable program retrievable with a browser, such as the indicated Java applet 34 stored at the user storage device 23 (FIG. 2) which applet is a separate Java-based program that can be downloaded to the user to permit him to design and create the sticker on his computer 18 using the display screen 27 by assembling text, graphic, and image elements on an on-screen work area representing a scaled version of the desired sticker and by saving through the server the design and its component parts as a high-resolution image. As will be presently seen, The Java applet 34 includes the various server links, pull-down menus and other tools, and the operating instructions to permit the sticker image to be continuously constructed in real time by the user with all changes made to the design being instantly viewable on the display screen in the on-screen work area.

The storage device 23 of the server (FIG. 2) will also be seen to include a set of Java servlets 35 which are dedicated to the server applet 34 and which perform various functions at the server as requested by the server applet 34 downloaded to the user by the links provided on the web pages displayed by the applet on the user display screen. These functions include taking the Java object based information from the applet and converting it into XML code to be stored in the database tables 41 when the user activates ("clicks on") a "save" link. Also, as requested by the user through the web links, other servlets 35 will retrieve information, e.g., clip art images or helpfiles, etc., and display it on the user's display screen 27. The servlets will remain persistent in that they will remain available throughout a sticker-building session (i.e., while the applet remains downloaded) and do not have to be spawned anew each time a new request is made. The servlet that converts Java objects from the applet 34 into XML code has a twin servlet at the server that can convert the XML code back into Java objects to be downloaded to the user when a previously constructed sticker is loaded back into the user's work area on his display screen 27. Also, a collection of servlets 35 are responsible for taking the XML code for a particular sticker and generating image files destined for high-resolution printer output. One set of servlets may make GIF or JPEG images from the XML when the sticker image is to be previewed by the user on-screen or sent to a printer on the user's computer, and the other set of servlets makes high resolution images (e.g., TIFF or EPS) from the XML code when the completed sticker image is to be sent for final professional printing.

The sticker building process of the present invention will now be described with reference to the computer display screen 27 web page representations as shown by FIG. 6 through FIG. 16 and which illustrate successive web pages as a typical user goes through the process of building a sticker to his desired design. Thus, as seen in FIG. 6, the web page which initially appears on the user's screen upon activation of the server's URL depicts a console 50, resembling a TV screen, having a series of hypertext links arranged about the periphery of the console in the form of "buttons" 51–58 which can be clicked on by the user with a conventional mouse or other position indicating 29 (FIG. 1) device to bring up new windows (from the server files) or to create new choices for the user in the lower, operating instruction half 62 of the screen within the console frame. These buttons include a button 51 labeled "New", a button 52 labeled "Save", a button 53 labeled "Help", a button 54 labeled "Portfolio", a button 55 labeled "Preview", a button 56 labeled "Text", a button 57 labeled "Picture", and a button 58 labeled "Shape". The screen within the console is divided into an upper, sticker building or workspace half 60 (initially blank) in which the sticker will be created in a predefined work area, and the lower, operating instruction half 62 wherein successive operating instructions will be provided as various of the buttons 51–58 are clicked on and different aspects of the sticker building process are addressed As can be seen from FIG. 6, the initial instructions given to the user within the operating instruction portion 62 of the sticker building screen instruct him to either click the "new" button 51 or the "portfolio" button 54. By clicking on the latter button he will open his own personal file (entitled "My Sticker Portfolio") within the user directories 40 (FIG. 2) and the appropriate Java servlet 35 at the server will download it into a separate window on the screen, as particularly shown in FIG. 15. This window will include a complete listing of the stickers which he has previously designed and filed away within the server's hard drive with each sticker having its own URL and with each sticker name in the screen listing comprising a link whereby the related sticker can be downloaded into the workspace area of the screen. He will then select the appropriate sticker and by clicking on it to cause it to be downloaded in an appropriately rescaled set of dimensions so as to fit within the predefined work area (defining a scaled version of the selected sticker outline) within the workspace area 60 of the screen utilizing the maximum dimensions of this workspace area to the extent possible. If, however, the user is a new user with no prior stickers created, or if the user wishes to create an entirely new sticker, he will click on the "new" button 51 which will result in the downloading of a new screen as shown in the FIG. 7 web page representation.

As can be seen in FIG. 7, upon activation of the "new sticker" routine, the workspace area 60 receives an outline of a blank canvas 70 representing the work area and a scaled-down version of the sticker to be created, the outline 70 being scaled so as to fill the workspace area 60 to the maximum extent possible. While the system of the invention shown is illustrated as producing a bumper sticker of the particular rectangular shape illustrated (a standard 8"×2½" bumper sticker), it will be understood that other sizes and relative dimensions of rectangular stickers (e.g., squares) can be created or that stickers (or images created for other end purposes) of different geometric shapes can be created, such as circles, ovals, etc., if desired. Thus, in the lower or operating instruction half 62 of the display screen, a pull-down menu 64 entitled "Layout" is provided with the "bumper sticker" as illustrated being listed as the default choice. As explained, other sticker shapes may be included here in the menu for alternative selection by the user. A second user-interface tool 66, entitled "Title", is provided including a small screen area or box 67 wherein the user may type in his selected title for the sticker to be created (here called "My Sticker 1"). Finally, a third user-interface tool 68 entitled "Color" is provided with a conventional color slider bar 69 which can be clicked on by the mouse 29 and dragged right or left throughout the underlying color spectrum indicator 69a to appropriately change the fill color within the area of the sticker outline 70 and thereby define the final background color of the sticker. As can be seen, separate links are provided including buttons for "Trash it", "Duplicate", "Close", and "Help" which permit the user to terminate the process either completely ("Trash it") or temporarily ("Close") or to seek further operating instructions ("Help") from the server which are provided in a separate text file 43 (FIG. 2) stored within the server hard drive. The "Duplicate" button permits the user to place a separate copy of a previously created sticker on the screen which he can then alter to create a wholly new sticker.

Once the user has selected the title and background color for his sticker, he will selectively and successively click on the three operating buttons 56, 57 and 58 to respectively create different text, pictures and shapes (geometrical shapes) on his stickers and both size and locate such sticker components on the sticker in any manner desired. While there is no required order in setting up the various components of the sticker, the software protocol has the later created items overlie (and cover) the earlier created items if they occupy the same space on the sticker canvas. In the operating sequence illustrated herein (FIGS. 6–16) the "shape" button 58 is clicked on first to update the operating instruction portion 62 of the console display screen by presenting the various shape properties user-interface menus and tools as shown in FIG. 8 on the operating instruction half 62 of the sticker builder screen. Thus, a first pull-down menu 80 entitled "Style" is provided wherein different basic shapes can be chosen with a rectangle 86 being the default shape (as shown in the workspace area 70 of the screen in its final position within the sticker outline). Other potentially selected shapes within the menu may include an ellipse or a triangle with the square and circle being specific equal height-width representations of the rectangle and ellipse shapes respectively. It will be noted from FIG. 8 that a second, thinly lined and identically shaped rectangle 86b closely surrounds the rectangle 86. This framing rectangle 86b (which will not be any part of the finished sticker) is fitted to closely surround the chosen shape and is provided with all of the chosen shapes and graphics during the creation process so as to always provide corner reference points (handles 86c at the corners of the rectangle) that can be clicked on and dragged by the pointing device 29 for accurately locating the shape position (i.e., pixel location) on the sticker and for moving the shape about the sticker. This framing rectangle 86b is obviously of use when the sticker is elliptical, for example, where precisely positioned reference points on the shape itself are not present. The Java applet includes a conventional click-and-drag programming sequence for the pointing device 29 to allow the chosen shape to be clicked on and moved to different positions within the dimensions of the overall sticker canvas 70. As the pointing device is released, the pixel position of the upper left-hand corner handle 86c of the framing rectangle 86b shape will be set and this position will be tagged within the XML code for the sticker so that the sticker can be accurately reproduced at some later date. With the embodiment of the invention as shown in FIG. 8, the default setting for the rectangle 86 is a square 86a (indicated in dashed lines) of 50 pixels by 50 pixels, and it will be set with its upper left-hand corner close to the upper left-hand corner of the canvas 70 as indicated by the dashed line representation shown in FIG. 8. By clicking and dragging with the pointing device, this rectangle can be moved by the user so that the lower right-hand corner thereof is moved to and fixed in position near the lower right-hand corner of the canvas 70 as indicated by the arrow 88 (FIG. 8).

The "Size" user-interface tool 81 in the operating instruction portion 62 of the screen can then be utilized by the user typing in the selected width and height pixel numbers (user chooses 330 and 140, respectively, in the FIG. 8 illustration) to expand the shape into the rectangular shape 86 (as pictured) or to create differently sized and shaped rectangles. A "Fill" user-interface tool 82 is also provided, as shown, with a "visible" box located therein which, if checked (by clicking on it), permits a click-and-drag color slider bar 82a (like the bar 69 of FIG. 7) to be manipulated back and forth to change the background color of the shape 86 on the canvas 70. If the "visible" box is not checked, the shape will remain the same color as the background color of the canvas (and therefore will not be visible in the final sticker unless a border is provided). Finally, a "Border" user-interface tool 83 is provided, which, if clicked on to check in the "visible" box, allows a differently colored border of varying pixel thickness (as set by the user typing in the "weight" box 84) to be provided about the outline of the shape 86. The color of this border can be set through the manipulation of a color slider bar 85 (similar to color slider bar 69 of FIG. 7). In the illustration (FIG. 8) indicated, the border is set at a different color so as to be visible and is at a three pixel thickness. A "delete" button 89a is provided to selectively remove the selected object being worked on from the sticker canvas, and a "close" button 89b is provided to terminate the entire operation, i.e., to force the user to either save or not save the existing sticker canvas. The conventional "help" button 89c is provided to download the help files 43 from the server storage (FIG. 2) and place it in a separate window on the user display screen.

Next, the individual lines of text can be added to the sticker by the user by clicking on the text button 56 and bringing up the text properties user-interface tools in the lower section 62 of the screen, as particularly shown in FIG. 9. A desired line of text is first typed into a box in the user-interface tool 92 where, as particularly shown in the illustrative example of FIG. 9, the word "HOGS" has been typed. The font user-interface tool 93 then can be manipulated to sequentially set the font type and size using a pull-down menu 93a (Helvetica is chosen in the example shown), a pull-down menu 93b for setting the style (plain, bold, italic or bold/italic), and a pull-down menu 93c for setting the thickness of the printing ("72 dpi" being chosen in the example). Each of these text font characteristics (type of font, style and size) are thus set by the user by means of pull-down menus 93a, 93b, and 93c. Finally, the color of the text can be set with the conventional color slider bar 94 (similar to slider bar 69, FIG. 7) as indicated. As with the previously described user-interface web page, buttons 95a, 95b and 95c are provided for deleting, closing or obtaining the help text file, respectively.

As the characteristics of the text are established, by means of the user tools 92–94, a text line 90 (FIG. 9) will be automatically placed on the sticker outline or canvas 70 on the upper, sticker building portion 60 of the display screen within a framing rectangle 98 that includes corner handles 98a for accurately establishing the pixel location of the text on the canvas so that it can be properly located on the sticker when the sticker image is reassembled using the XML code. The newly created text line is initially placed in a default position by the applet 34 programming with the upper left-hand corner 98a thereof being located close to the upper left-hand corner of the canvas. As with the shape elements, the framing rectangle 98 (along with the enclosed text line) can then be moved by clicking and dragging it so as to position it in the desired position on the canvas.

If it is desired to add another line or lines of text to the sticker, the text button 56 is clicked on once more to reset all of the controls 92, 93 and 94 to their default positions with the text box in tool 92 being cleared to allow for the typing of a new line of text by the user. As this new line of text is created and its font and color selected, it will automatically be placed on the sticker canvas 70 in the default position (upper left-hand corner) over any preexisting text or shape which may exist in that position, and such new text line can then be moved about the sticker to align it with the previous line of text or to place it in any other appropriate position.

In the illustrated sequence, once all of the desired shapes and text lines have been added to the sticker, graphical images or pictures can also be added by clicking on the "picture" button 57 (FIG. 9) and, initially, downloading from the server files a separate clip art picture window 100, as shown in FIG. 10. A pull-down menu 102 at the top of the window can be clicked on to select from either the clip art pictures (which can be downloaded from the server directories 42, FIG. 2) or a listing entitled "My Uploaded Pictures" which will include only graphical images uploaded into the server database directories by the user in a manner to be explained hereinafter. When the server clip art pictures are selected by clicking on the "Go" button 103 with the listing "Clip Art Pictures" being shown in menu box 102, several different server directory listings, each representing a "category" of related images, will be presented in a pull-down menu 108 (FIG. 10). By clicking on the "Show"

button 109, the selected category of clip art pictures or images will be presented as a spaced series of small, low resolution thumbnail pictures 104, as can be seen in FIG. 10 wherein the selected category of clip art pictures is "borders_frames". These thumbnail pictures 104 are the low resolution (e.g., 72 dpi) files downloaded from the server's directories 42 (FIG. 2) and scaled down to fit in the window spaces 104 as shown, it being recognized that similar high resolution images exist in directories 42 for producing the final sticker image suitable for printing. The series of separate graphical images or pictures 104 are presented in the window 100 with a conventional scroll bar 106 being provided along the right-hand side of the window so that additional images 104 (not shown herein) can be included within a single viewable category as necessary.

Each of the images 104 can be added to the sticker canvas 70 by clicking on the link "add to sticker" above the selected image, as shown in FIG. 10, and bringing the image, in the thumbnail size as shown, into the default position with the upper left-hand corner of its framing rectangle being positioned near the upper left-hand corner of the canvas. Then, with the conventional click-and-drag operation of the user's pointing device 29 on the framing rectangle, the image may be both resized (smaller or larger) and moved to any chosen position on the canvas.

The separate pull-down menu 108 for the clip art pictures is provided so that a number of different categories of clip art pictures 104 can be provided in the window 100. For example, in the illustration of FIG. 10, the selected category is "borders and frames" with various clip art pictures being provided which, as can be seen in FIG. 10. each form a segment of a border or frame that can be used to border or frame out text or other graphical images previously placed or to be placed on the sticker. Obviously, other categories such as trees, flowers, faces, etc., can be provided and individually reviewed by the user in selecting his desired sticker design.

If, in addition to or in substitution for, the clip art pictures 104, the user wishes to add his own graphical images or pictures to the sticker image, the pull down menu 102 is changed to "My Uploaded Pictures", and, when the "Go" button 103 is clicked on, the window 100 will be changed to the window 100A as shown in FIG. 11. The user may then type into box 110 the file name of one of his images (such as a digital photograph) stored on his PC hard drive 23, or by clicking on the "browse" button 112, the user's browser will be activated to open a new window presenting a directory-style listing of the files on the user's local PC hard drive 23 (FIG. 1) from which he can select the file to be uploaded. The user will then select the file name of the particular image which he wishes to upload, and he will place this file name within the box 110. When the image to be selected, in any appropriate graphic format, is indicated in box 110, the "Upload" button 114 is clicked on to upload the selected image into the server's image directory 40 (FIG. 2) at the size and resolution as found in the user's file. Irrespective of such size and resolution, the programming at the server will then produce a second image by resizing the user image to the shape of a thumbnail sketch the same size and resolution as the clip art pictures 104 and place it at the bottom of window 100A, as shown by the illustrated previously uploaded user images 120, 121 and 122 in FIG. 11. The user may then select one or more of his uploaded images to be placed on the canvas 70 by clicking on the "Add to sticker" link immediately above the selected thumbnail image. This will cause the image to be placed in the default position on the canvas 70 with the upper left-hand corner of the framing rectangle being located close to the upper left-hand corner of the canvas where it can be subsequently manipulated by the aforedescribed click-and-drag procedure. It will be noted, however, that the downloading of the user image from the user's image directories 40 will place the image on the canvas 70 at its original uploaded size and resolution as received from the user. Thus, in the illustrated example, when the thumbnail image 122 is selected and clicked on (FIG. 11), the full-sized image 122a as shown in FIG. 12 will be placed on the sticker canvas 70. As can be seen, when the image 122a is larger than the dimensions of the canvas 70, that portion of the image outside of the canvas is not shown on the display screen. However, by using the "Scale" user-interface tool 134 FIG. 12) and reducing the % factor appropriately by user keyboard 28 input, the image can be resized into the proper proportions for the sticker as represented on the sticker-building canvas 70 seen in FIG. 13. Also, by using the pointing device 29 and clicking and dragging the framing rectangle 122b of the image, the image can be repositioned on the canvas by the user so that it will be correctly located as well as sized on the finished sticker.

It should also be noted that, by clicking one of the selected thumbnail pictures (104 of FIG. 10 or 120–122 of FIG. 11) the window 100 or 100A is terminated and the picture properties screen as shown in FIGS. 12 or 13 fills the lower portion 62 of the sticker building screen. This picture properties screen will be seen to include the selected thumbnail picture at 131 and a user-interface tool 132 entitled "Effects" wherein a black-and-white or grayscale representation of the uploaded picture can be selected (by clicking on or not clicking on the indicated box), the colors of the picture can be reversed if "Negative" is selected (by clicking in the indicated box), and the brightness of the color can be increased by selecting (by clicking on) the "Brighten" feature. The scale user-interface tool 134, previously described, is also provided in the operating instruction portion 62 of the console screen with a % box being provided for selectively scaling the picture up or down (from 100%) to increase or decrease its size upon the face of the sticker canvas 70. As can be seen, the FIG. 13 representation 122c of the user graphic is a result of a 30% scale factor being applied to the original image 122a (FIG. 12).

When the sticker has been completely built in accordance with the user's wishes, the user may push the save button 52 on the screen and a small window 140, as indicated in FIG. 14, appears. By clicking on "Ok" the sticker will be placed in the user's file (FIG. 2) in the server directories 40 and an XML code for the sticker will be created at the server as previously explained for loading into the database tables 41. The user may then create another sticker by starting the process over or he may terminate it and leave the program. The sticker as presented on the canvas 70 will be saved in the server database in its component parts and in different locations therein. Thus, the graphic images on the sticker will be separately stored in separate Java object files in the directories 40 and 42 (FIG. 2) and the XML code created by the Java servlet will fix the position of each of these objects on the completed canvas as well as recreate the text lines and fix their positions on the canvas in accordance with the framing rectangle pixel positions.

If a sticker has been previously constructed on the system of the present invention by the user, he may retrieve it for printing or he may wish to make modifications or duplicates of the sticker which can then be modified to create a new sticker. This is accomplished initially by pressing the portfolio button 54 on the left hand side on the sticker building screen which causes the server programming to present the window "My Sticker Portfolio" as seen in FIG. 15. As is indicated in this window, each of the individual user's previously created stickers 161, 162, 163 is listed and, by clicking on any one of these indicated links, the appropriate sticker image can be brought up into the canvas location on the workspace area 60 of the console 50 screen. Upon the termination of the proceedings, and when the user decides that the appropriate and final design of the sticker has been achieved, the preview button 55 on the console can be clicked on to provide a window 170 as shown in FIG. 16 wherein the final low resolution version of the sticker image 70 will be presented for final approval by the user.

Figure 3:
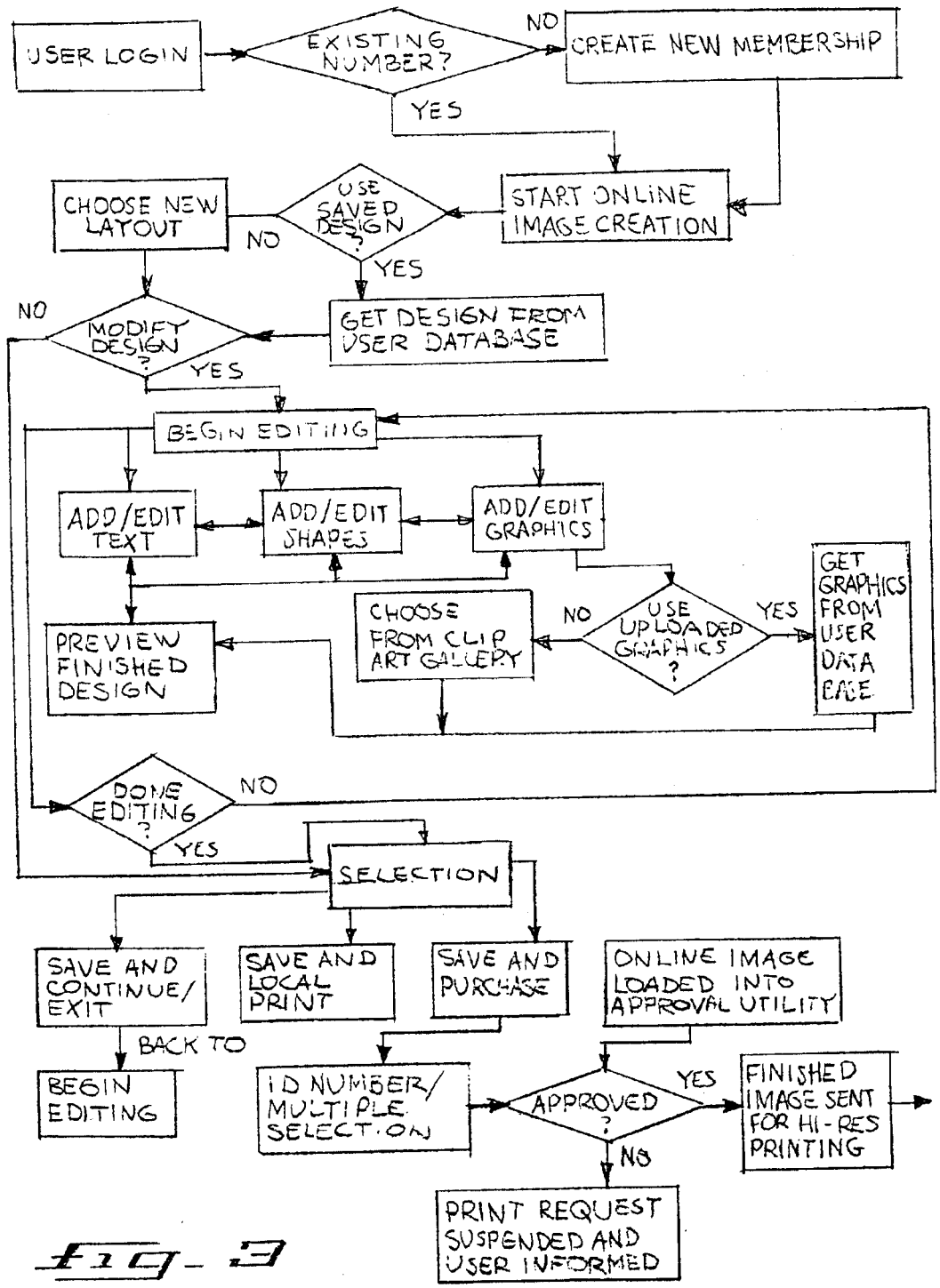
FIG. 3 is a flow chart illustrating the process of the present invention from the user's standpoint in creating a new composite image.

A flow chart of the programming operations of the Java applet 34, as seen from the user's standpoint, is shown in FIG. 3 of the drawings. After login, i.e., calling up the server URL on the Web, the user will identify himself to permit the appropriate user directory 40 (FIG. 2) information to be addressed, or alternatively, the user will log in as a new user and create a new membership. The sticker or image building sequence of steps will be initiated with the appearance of the console screen as shown in FIG. 6. The user then either retrieves one of his prior saved sticker designs from the server database (FIG. 15) or creates a new sticker with a new canvas 70 on the computer display screen (FIG. 7). As seen in FIG. 3, the user may take his prior sticker design directly to the final processing steps or he may edit it following the same image creating steps as with a completely new sticker design Thus, editing will be seen to consist of the parallel/sequential steps of adding/editing text (FIG. 9), adding/editing shapes (FIG. 8), and adding/editing graphics either from the clip art gallery (FIG. 10) or from the user database (FIGS. 11 to 13). Upon completion of the editing process, the newly designed sticker can be saved (FIG. 14) and (1) the user can be returned to the "begin editing" step to create a new sticker; or (2) the user can print out a low resolution version of the sticker on his own printer, or (3) the user can purchase a sticker (or a number thereof) with the stickers being professionally printed in a high resolution format as saved in the server files as previously explained. This latter step will involve a conventional secure payment transaction and a final approval of the finished sticker design by the server. In assembling the high resolution image for final approval, the server will utilize the full size high resolution (e.g., TIFF or EPS) clip art images. The user uploaded images will be converted to the final high resolution format that is chosen by the user. The text and shape components of the sticker can be scaled up to the appropriate size and chosen high resolution using conventional vector scaling programming. The final high resolution image of the sticker will then be finally approved for both content and quality by the server so that the finished sticker image can be sent to the printer for professional printing.

FIG. 5 is a flow chart of the previously described process of the present invention as seen from the server which particularly utilizes the servlets 35 (FIG. 2) that control the programming and file exchange at the server. Thus, a servlet will take each of the images that form one of the component parts of the complete sticker design (text lines, shapes, user uploaded images, server clip art images) and translate that image into an XML file by using the appropriate tags to properly define the image, its color, font, style, etc., its location in a server directory if it is a stored graphic, and its particular pixel location on the sticker canvas. The XML data file for each sticker created will then be stored in the database tables 41 (FIG. 2) in the form as set forth in the manner illustrated in FIG. 4. When the server is requested to download a sticker to a user computer, a servlet will interpret the appropriate XML file and reconstruct the image using one or more downloaded images from the directories 40,42 if necessary. The Java objects created by the servlet will then be loaded into the applet 34 and downloaded to the user. Alternatively, the servlet may render a high resolution image by using the high resolution image files from the directories 40,42 which is sent to a server computer screen for approval as a high resolution (300 dpi minimum) image that can be sent to a final printing operation.

Although the best modes contemplated for carrying out the present invention have been herein shown and described, it will be apparent that other modifications and variations may be made without departing from what is regarded to be the subject matter of the invention.

What is claimed is:

1. An interactive system for permitting a user with a computer and display screen to design and generate, through a global computer information network connection with a server, a web page composite image including graphical images and text, said system comprising:

means for permitting the user to selectively create an outline of a shape out of a plurality of predetermined two-dimensional shapes within a predetermined area on the display screen, files for producing a plurality of graphical images and lines of text stored at a server software storage remote from the user, means for permitting the user through a browser to selectively download said files for producing said graphical images and incorporating each selected graphical image into any selected position in said predetermined area on the display screen means for permitting the user to selectively download a file for producing a line of text into any selected position in said predetermined area in the display screen and to selectively repeat the operation for subsequent lines of text, said means for producing a line of text including means for permitting the user to originate the specific content of each line of text by typing it in on the display screen during the image creation process, and means for permitting the user to utilize a position indicating device with said user's computer to individually vary the sizes and relative positions of the lines of text, graphical images and shape within said predetermined area on the display screen, whereby a complete composite image can be created by the user and modified by the user with the entire image being continuously seen on the user's display screen during its creation, means for permitting the user to download said files causes the framing representation of each file to be initially located in a particular orientation at a specific position in said predetermined area on the display screen so that later changes by the user in such position will be recorded by the user for transmittal back to the server.

2. A system according to claim 1 including means for storing said text and graphical image component parts of the composite image and the locations thereof within said predetermined area of the display screen as modified by said user in a computer/web protocol which includes vector scaling programming.

3. A system according to claim 2 wherein said computer/web protocol is an XML code.

4. A system according to claim 1 wherein said graphical images downloadable from said server are in the form of a plurality of different categories of similar types of images with a number of different selections being provided in each category, and means for permitting the user to select desired images from one or more categories.

5. A system according to claim 4 wherein one of said categories includes various types of frames and borders for said composite image, said graphical images including frame or border segments which can be incorporated into the composite image to form a border or frame about other graphical images or lines of text incorporated into the composite image.

6. A system according to claim 1 including means for permitting the user to upload graphical images into the files for producing graphical images at the server so that the user can utilize his own graphical images in the composite image.

7. A system according to claim 1 including means for permitting the user to selectively change the color within the selected shape.

8. A system according to claim 7 including means for permitting the user to selectively add a border to said selected shape.

9. A system according to claim 1 including means for permitting the user to vary the relative proportions of the selectively created shape within said predetermined area on the display screen.

10. Art interactive system for permitting a user with a computer and display screen to design and generate, through a global communication network connection with a server, a web page composite image suitable for high quality printing, said image including graphical images and text, said system comprising:

means for permitting the user to selectively create said composite image within a predetermined area on the display screen, files for producing a plurality of high resolution images and text stored at a server software storage area remote from the user, means for permitting the user to selectively download through a browser said files for producing individual lines of text and graphical images and to incorporate said lines of text and selected graphical images into any selected position in said predetermined area on the display screen, said means for producing lines of text including means for permitting the user to originate the specific content of each line of text by typing it on the display screen during the image creating process, means for permitting the user to individually vary the sizes and relative positions of each line of text and each selected graphical image within said predetermined area of the display screen to create a complete composite image to the user's specifications, means for transmitting from the user to the server said complete composite image in its selected component parts and their respective locations within the predetermined area of the display screen, means at the server for storing said component parts of the complete composite image in a computer/web protocol that permits the image to be output by the server in a variety of different formats, and means at the server utilizing said computer/web protocol for providing a high resolution image of said complete composite image suitable for high quality printing, means for permitting the user to download said files causes the framing representation of each file to be initially located in a particular orientation at a specific position in said predetermined area on the display screen so that later changes by the user in such position will be recorded by the user for transmittal back to the server.

11. A system according to claim 10 wherein said computer/web protocol includes vector scaling programming.

12. A system according to claim 10 wherein said high resolution images are 300 dpi or better and said low resolution images are less than 100 dpi.

13. A system according to claim 10 wherein said graphical images include digital photographic images initially uploaded from the user to the server.

14. A method for permitting a user with a computer and display screen to create on-line with a server through his browser and a global communication network a composite image from diverse sources, said composite image being suitable for high quality printing output, said method comprising:

providing a collection of high resolution graphical images at the server and permitting said user to selectively download through his browser representations of various of said high resolution graphical images, providing at the server downloadable program through a browser to said user to permit the user to permit the user to create said composite image in a predetermined area on the user's display screen, said program including means for permitting the user within said predetermined area of the display screen to vary the size of each selected graphical image and move it to any position in said predetermined area of the display screen, said program further including means to permit the user to originate and sequentially add one or more lines of text to the predetermined area of the display screen and to resize and individually selectively reposition each of said lines of text to any position within said predetermined area, providing means for permitting the user to transmit the composite image back to the server with all changes in size and repositioning of each of the downloaded lines of text and graphical images being correlated to a specific initial location within the predetermined area on the display screen so that the composite image can be accurately recreated at the server, and saving at the server the completed composite image from the user in each of its line of text and graphical image component parts so that the composite image can be recreated at the server as a high resolution image suitable for high quality printing.

15. A method according to claim 14 wherein the means for permitting the user to transport the composite image back to the server comprises a computer/web protocol which includes vector scaling programming.

16. A method according to claim 15 wherein said computer/web protocol is an XML code.

* * * * *